United States Patent [19]
Charlton

[11] 3,985,030
[45] Oct. 12, 1976

[54] ULTRASONIC ACOUSTIC PULSE ECHO RANGING SYSTEM

[75] Inventor: Michael Roger Charlton, Birmingham, England

[73] Assignee: William McGeoch & Company, Birmingham, England

[22] Filed: Oct. 29, 1974

[21] Appl. No.: 519,033

[52] U.S. Cl. .............................. 73/290 V; 340/1 L; 340/3 E
[51] Int. Cl.² ...................... G01F 23/28; G01S 9/68
[58] Field of Search ............ 340/1 L, 3 E; 73/290 V

[56] References Cited
UNITED STATES PATENTS

| | | | |
|---|---|---|---|
| 2,775,748 | 12/1956 | Rod et al. | 340/1 L |
| 3,084,331 | 4/1963 | Dudley | 340/3 E |
| 3,469,261 | 9/1969 | Lambert, Jr. et al. | 340/3 E |

FOREIGN PATENTS OR APPLICATIONS

| | | | |
|---|---|---|---|
| 1,241,663 | 8/1971 | United Kingdom | 340/3 E |

*Primary Examiner*—Richard A. Farley
*Attorney, Agent, or Firm*—Toren, McGeady and Stanger

[57] ABSTRACT

An ultrasonic acoustic pulse echo ranging system for monitoring the depth of liquid in a tank has transmitter and receiver transducers for mounting side-by-side in an upwardly directed disposition and exposed to the liquid at a datum level. A transmitter and receiver are adapted for coupling to the transducers from outside the tank. The transmitter includes an ultrasonic frequency oscillator for energizing the transmitter transducer to transmit acoustic pulses of the ultrasonic frequency, a gate to start the oscillator, a continuously cycling counter coupled with and effective to actuate the gate to start the oscillator at the start of each counting cycle, a regulator to stop the oscillator to determine the length of each transmitted acoustic pulse in terms of the number of cycles of the ultrasonic frequency in the pulse. The receiver is arranged to detect outputs from the receiver transducer and to generate output pulses in response to echoes of the acoustic pulses from the free surface of the liquid. A display device, and latching means responsive to the output pulse of the receiver to connect the counter to the display device to display a measure of the time interval between the transmission of an acoustic pulse and the detection of its echo. The regulator includes a regulating counter of the ultrasonic cycles which is resettable at zero by the stopping of the oscillator, and a count comparator, which is coupled to the latching means, to determine that the regulator is responsive to variations between successive measured time intervals to regulate in the sense of the variations, the length of the next transmitted pulse.

8 Claims, 3 Drawing Figures

ULTRASONIC ACOUSTIC PULSE ECHO RANGING SYSTEM

This invention relates to ultrasonic acoustic pulse echo ranging systems of the kind whereby the distance of a reflecting boundary of a liquid from a source of an acoustic pulse of ultrasonic frequency is determinable as a function of the time interval between the transmission of the pulse into the liquid medium and the reception, at a position adjacent to the source, of an echo of the pulse from the reflecting boundary, the speed of transmission in the liquid medium being known. The invention is particularly concerned with such a system for monitoring the depth of liquid above a datum level in a tank, for instance an ageing tank in a brewery, the reflecting boundary being the free surface of the liquid.

SUMMARY OF THE INVENTION

An aim of the invention is to provide such a system whereby a liquid depth of at least the maximum which in practice may occur in a tank, say up to twentyfive meters, can be determined with a high degree of accuracy, for instance plus or minus one centimeter, without need for high transmitted power, and also quite shallow depths can determined equally accurately.

It has been found that accuracy of measurement may be affected by the presence in the liquid of suspended particles, particularly at shallow depths when the density of the suspension may tend to increase. It has also been discovered that the accuracy of measurement in such conditions can be restored by appropriately regulating the acoustic energy of the transmitted pulses, preferably by regulating the pulse length, i.e. the number of cycles of the ultrasonic frequency in the pulse.

According to the invention there is provided an ultrasonic acoustic pulse echo ranging system for monitoring the depth of liquid above a datum level in a tank, the system comprising a transmitter transducer and a receiver transducer for mounting side-by-side, upwardly directed and exposed to the liquid in the tank at the datum level, and, for coupling to the transducers from outside the tank, a transmitter including an ultrasonic frequency oscillator to energise the transmitter transducer to transmit acoustic pulses of the ultrasonic frequency, a gate to start the oscillator, a continuously cycling counter coupled with and effective to actuate the gate to start the oscillator at the start of each counting cycle, a regulator to stop the oscillator to determine the length of each transmitted acoustic pulse in terms of the number of cycles of the ultrasonic frequency in the pulse, a receiver to detect outputs from the receiver transducer and to generate output pulses in response to echoes of the acoustic pulses from the free surface of the liquid, a display device, and latching means responsive to a receiver output pulse to connect the counter to the display device to display a measure of the time interval between the transmission of an acoustic pulse and the detection of its echo, the regulator including a regulating counter of the ultrasonic cycles which is re-settable at zero by the stopping of the oscillator, and the regulator including a count comparator, which is coupled to the latching means, to determine that the regulator is responsive to variations between successive measured time intervals to regulate, in the sense of the variations, the length of the next transmitted pulse.

Preferably the regulator is responsive to said measured time interval being not less than a predetermined minimum value to regulate the number of cycles of the next transmitted pulse to a predetermined maximum value, is responsive to said measured time interval being less than said minimum value to regulate the energy of the next transmitted pulse to a value less than said maximum value, and is responsive to variation of successive measured time intervals of values not greater than said minimum value to regulate, in the sense of the variation, the number of cycles of succeeding transmitted pulses.

Preferably also there is provided a regulator override responsive to outputs from the receiver transducer to actuate the regulating means to regulate the number of cycles of the transmitted pulses to said maximum value in response to the absence of outputs from the receiver transducer.

As previously indicated, it is convenient to regulate the acoustic energy of a transmitted pulse by regulating the number of ultrasonic frequency cycles in the pulse.

It may be desirable to compare the depth or quantity of liquid in the tank, being a function of the time interval between transmission of a pulse and the detection of its echo, with one or more standard values, for instance a specific maximum and/or minimum value. Such a comparison may be desirable to prevent the introduction or removal of an excess amount of liquid to or from the tank, or to control the introduction or removal of specific amounts of liquid. There may therefore be provided an adjustable preselector of a standard value of the function of the measured time interval, a first comparator of said standard value and the measured values derived from detection of echoes of the transmitted acoustic pulses, and a discriminator to provide an output representative of the relation between the standard value and each measured value.

BRIEF DESCRIPTION OF DRAWING

The invention is further described, by way of example, with reference to the accompanying drawings, wherein.

DESCRIPTION OF PREFERRED EMBODIMENTS

Figure 1:
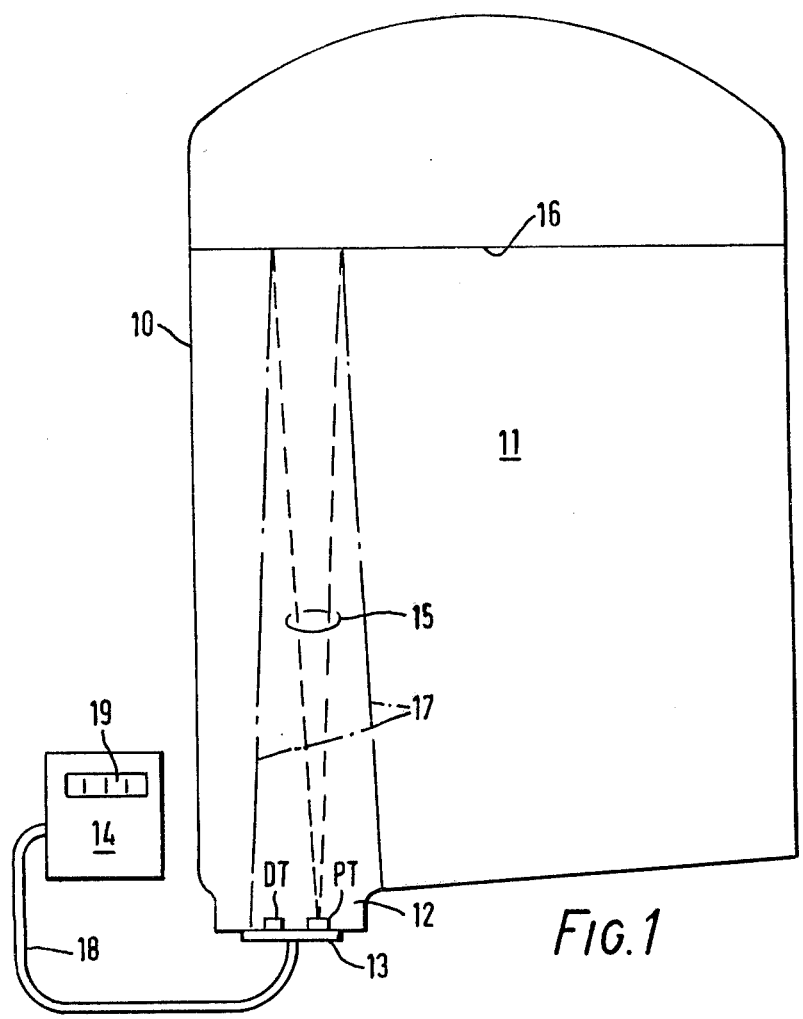
FIG. 1 represents diagrammatically the use of the invention to monitor the quantity of liquid in a tank.

Referring to FIG. 1, a tank 10 is partly filled with liquid 11. In a horizontal access flange at the bottom of a sump 12 are mounted side-by-side a transmitter transducer PT and a receiver transducer DT with their operative faces upwardly directed in the same horizontal plane which is a datum level. The transducers PT, DT can be mounted in any convenient manner in a disclike holder 13 which is releasably secured in said access flange in a liquid-tight manner. In any convenient position outside the tank 10 is provided a housing 14 containing circuitry, described hereinafter, connected to the transducers PT,DT by cabling 18. The circuitry will energise the transmitter transducer PT to direct upwardly in the liquid, in a narrowly divergent path 15, successive pulses of an ultrasonic frequency signal at a controlled pulse rate and length, and will detect the reception, by the receiver transducer DT, of echoes of reflections from the underside of the liquid surface 16 in the downwardly divergent path 17. The interval between the transmission of a pulse and the reception of its echo will be represented by a digital display 19 at the housing 14 as a direct reading of the depth of the liquid above the datum level or, in an appropriately shaped tank, the quantity in any convenient units, for instance in barrels when the liquid is the content of a vat in a brewery.

Figure 2:
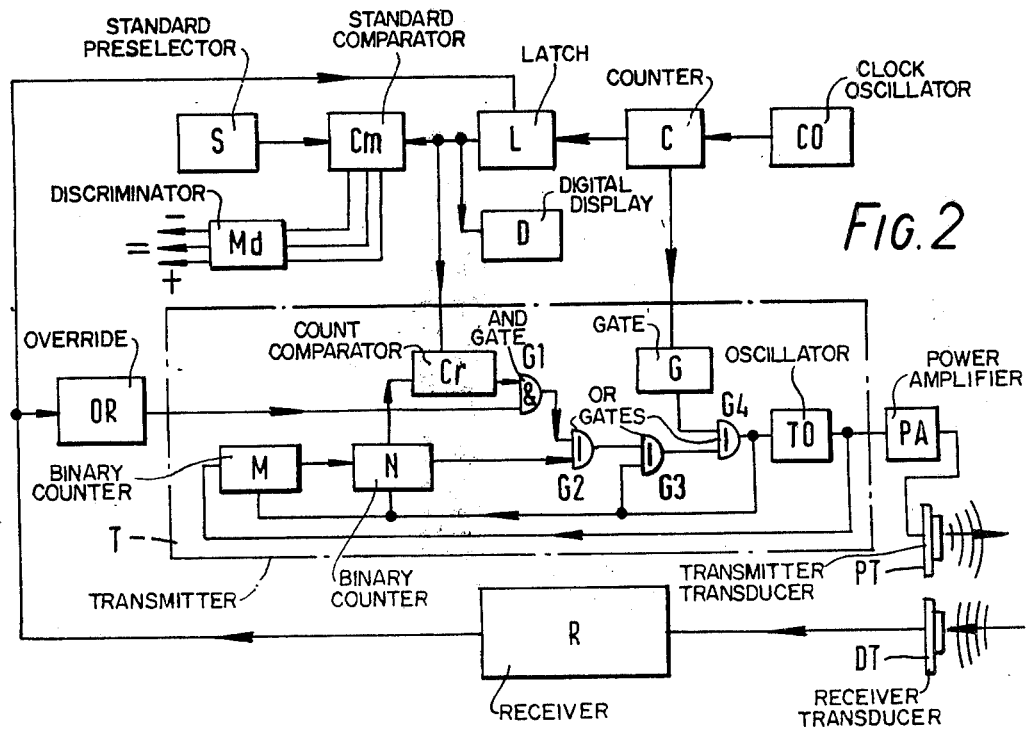
FIG. 2 is a block diagram of the basic circuitry for generating the transmitted pulses and detecting the reception of echoes of the pulses in the arrangement of FIG. 1; and, FIG. 3 is a block diagram of the circuitry in more detail.

The basic circuitry represented in FIG. 2 has five main functions. First, to cause the transmitter transducer PT to transmit pulses of ultrasonic frequency at a controlled repetition rate and of not more than a predetermined maximum length; second, to detect the reception of a reflected pulse by the receiver transducer DT and display the interval between the transmission of a pulse and receipt of its echo as a function of the distance of the liquid surface 16 above the transducers; third, to compare the measured interval with a preset standard; fourth, to regulate the pulse length in a manner to cause it to be automatically reduced when the interval is less than a predetermined minimum; and fifth, to override the automatic regulation in the event of no echo being detected.

In FIG. 2, a 72 kHz clock oscillator C0 drives a continuously running binary counter C which has an output to a latch L. There is also a connection from the counter C to a mono-stable gate G which is biassed closed and is an element of a transmitter unit T. The transmitter unit T includes a 500 kHz oscillator T0 which is connected through a power amplifier PA to the transmitter transducer PT. The counter presents to the gate G a 7.2 Hz control, derived from the 72 kHz clock oscillator C0, so that the gate G will be opened a little more often than seven times a second. Between the gate G and the oscillator T0 is connected one gate G4 of a bi-stable element comprising two gates G3,G4. In the ready state of the circuit the oscillator T0 will be energized through the gate G4 from the opened gate G. By means described below, the condition of the bi-stable element G3,G4 will be normally changed to stop the oscillator T0 after, say, 33 cycles. The transmitter transducer PT is thus ordinarily caused to transmit pulses at a rate slightly faster than seven per second, each having a pulse length of 33 cycles of the 500 kHz frequency, so that the pulse length is very short relatively to the interval between successive pulses.

The reception of an echo, from the liquid surface 16, by the receiver transducer DT is detected by a receiver R, described in detail below with reference to FIG. 3, which is thereby caused to supply an output to the latch L, to cause the reading of the counter to be applied to the display device D. The continuously running counter C will actuate the gate G only when the counter is in its zero condition, so that each reding transferred to the display device D will be representative of the interval between the transmission of a pulse and the detection of its echo. At a pulse frequency of about seven per second, the display device D will present a display which, for all practicable purposes, is a continuous indication of variations of the measured value.

As previously indicated, the measured intervals are conveniently expressed in terms of the depth of the liquid. Where the liquid is aqueous, a clock oscillator frequency of 72 kHz is convenient in view of its relation to the speed of sound in water, i.e. 1440 meters per second.

Through the latch L the reading of the Md is also presented to a standard comparator Cm which compares the reading with a standard reading set up in a preselector S. The standard comparator presents to a discriminator MD a comparison between the measured depth and the standard, and the discriminator Md presents an output which is negative ($-$), equal ($=$), or positive ($+$) according to whether the measured depth is less than, equal to, or greater than the preselected standard. The output of the discriminator Md may be used for regulating the level or amount of liquid in the tank, and for other purposes such as controlling remote indicators, recorders and other telemetering devices.

It is found that in some circumstances, particularly at shallow depths when the liquid contains suspended matter which may be more concentrated when the liquid level is low, it is advantageous to vary the transmitted acoustic power with the depth. The preferred manner of varying the transmitted power is by varying the pulse length, i.e. the number of cycles of ultrasonic frequency in the pulse. The requirement for such variation occurs only when the depth is less than a predetermined value; for greater depths the pulse length can be maintained constant at a predetermined maximum value. The transmitter T incorporates means for automatically regulating the pulse length.

The transmitter includes a regulating counter comprising a first binary counter M receiving its input from the oscillator T0 and having an output to a second binary counter N. The second binary counter N has a high-count output to an "Or" gate G2 and a Low-count output to a second count comparator Cr which is connected to the output from the latch L so as to be responsive to the count released to the display device D when the latch L is actuated by the detection of an echo. The first binary counter M responds to the number of cycles transmitted by the oscillator T0 to advance the second binary counter N by one step for each successive "m" cycles, and the second binary counter N counts the steps up to a predetermined high value which corresponds to the maximum pulse length to be transmitted when the measured depth is not less than a predetermined minimum value. During the generation of a transmitted pulse, the count comparator Cr presents a value, derived from the main counter C, which is representative of the depth measurement derived from the echo of the previously transmitted pulse. If the number in the second binary counter N reaches the preset high value before equalling the value represented in the cound comparator Cr, there will be a high-count output from the second binary counter N directly to the "Or" gate G2 which, through a connection to the gate G3 of the earlier mentioned bi-stable element G3,G4, will actuate the element G3,G4 in the sense to stop the oscillator T0 and thereby determine that the transmitted pulse has the predetermined maximum length. If however, before reaching the preset high value, the number in the second binary counter N becomes equal to the value represented in the count comparator Cr, an output from the count comparator Cr via an "And" gate G1 to the Or gate G2 will change over the bi-stable element G3,G4 to stop the oscillator T0 and thus terminate the transmitted pulse with an appropriately shortened pulse length. Connections from the bi-stable element G3,G4 to the counters binary M,N provide for them to be automatically reset to zero when the oscillator T0 is stopped.

As now described in more detail with reference to FIG. 3, the main counter C is a four-stage device for presenting a four-figure reading and for effecting the above mentioned automatic regulation of the pulse length it is convenient to present only the two most significant figures of the display to the count comparator Cr in the transmitter T. For instance, the binary counters M.N are so set that if the said two most significant figures presented to the count comparator Cr are not less than 08 the next transmitted pulse will be terminated with a length of 33 cycles which is the predetermined maximum pulse length. The first binary counter m is set to advance the second binary counter N one step for every four cycles of the output from the oscillator T0. The second binary counter N is so set that when it has advanced eight steps, which represents the preset high count, corresponding to 32 cycles of the oscillator T0, it will not have reached parity with the number represented in the count comparator Cr and the oscillator T0 will be stopped directly from the second binary counter N via the Or gate G2. Due to the normal inherent slight delay of operation of the circuitry the oscillator T0 will generate one more cycle before it stops, so that the transmitted pulse will be 33 cycles. If the number represented in the count comparator Cr is less than 08, then the next pulse length will be proportionately less than 32+1 cycles. For instance, if the number in the count comparator Cr is 05, then when 20 cycles are counted the second binary counter will reach parity with the count comparator Cr at a count of 5 and the oscillator T0 will be stopped from the count comparator Cr via the And gate G1 to cause the transmitted Pulse length to be 21 cycles.

At very low levels of the liquid the most significant figures of the four-figure display would be 00, but it would still be required that a pulse be transmitted in order to obtain measurements at those low levels. In such conditions the tendency of the automatic regulator would be to stop the oscillator T0 almost simultaneously with the start of the operation of generating a pulse; however, due to the above mentioned inherent delay, the oscillator T0 will generate a pulse of one cycle which will be sufficient to provide a measurement of the depth at such a very low level.

It is desirable to provide a safe-guard to meet the condition of no echo of a pulse being received, because it might be a malfunction. For instance, the absence of detection of an echo might occur when in fact the level of liquid is so high that it is desirable for the transmitted pulses to be of the predetermined maximum length, i.e. 33 cycles in the example. However, the automatic regulator would respond to the absence of the detection of an echo by causing the next transmitted pulse to have the minimum length, i.e. one cycle, in which case, even if the malfunction was only temporary, the system may not recover. There is therefore provided an over-ride device OR, having an input from the output of the receiver R and an output to the And gate G1, and being set to require to receive a predetermined number of successive output impulses from the receiver R to prevent the And gate G1 becoming automatically set to a condition in which it will prevent the oscillator T0 being stopped directly from the count comparator Cr. If then the receipt of an echo is not detected, despite pulses continuing to be transmitted by the transmitter transducer PT, the over-ride device OR will eventually stop the path from the count comparator Cr through the And gate G1 and the next transmitted pulse will be of the maximum length, i.e. 33 cycles in the example, due to the effect of the regulating counter M,N acting directly through the Or gate G2. In the event of there continuing to be no detection of an echo, the situation can be indicated as described below the reference to FIG. 3.

Figure 3:
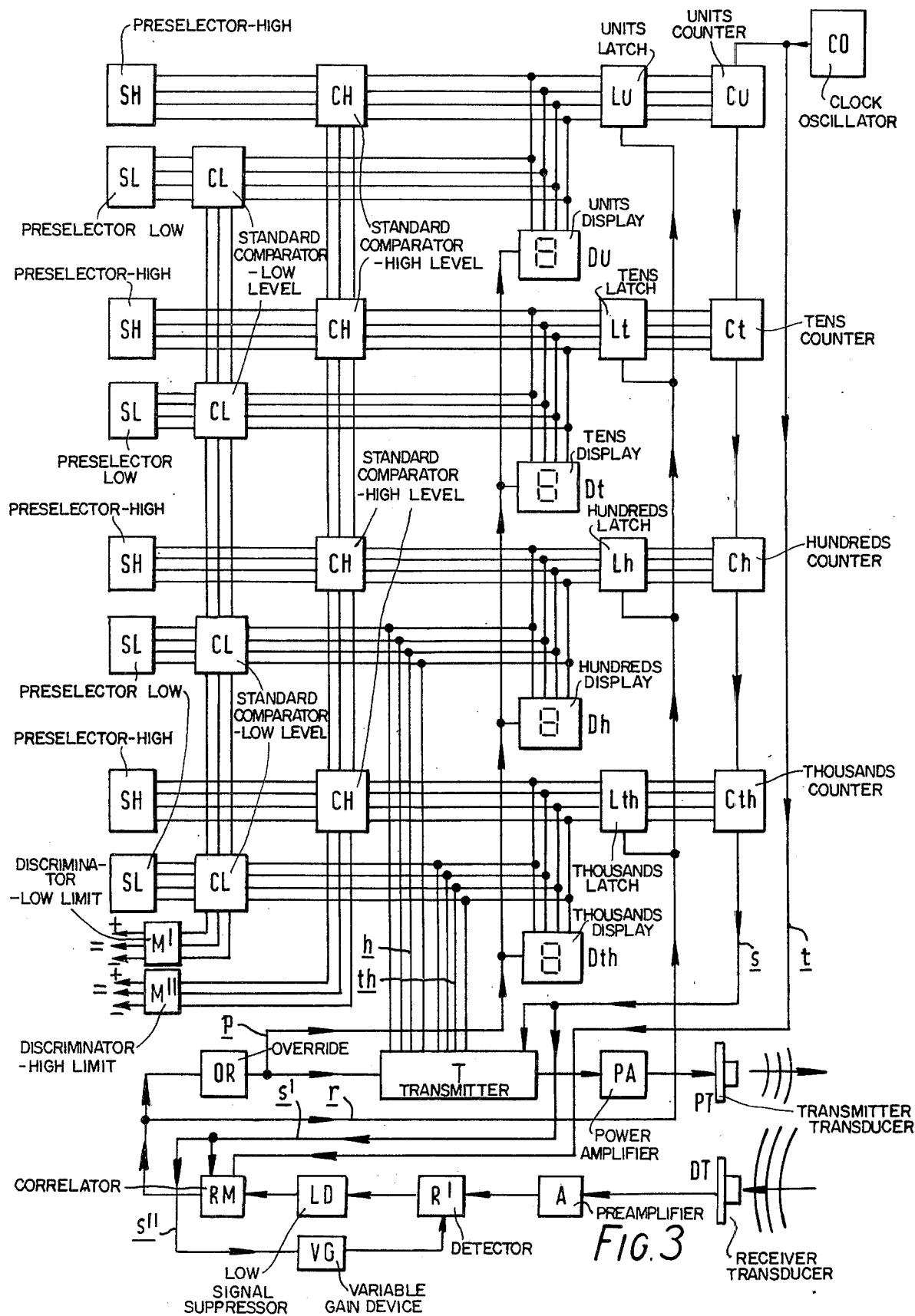

In FIG. 3, the transmitter T is assumed to contain the automatic regulating circuitry described above. The circuit of FIG. 3 represents a four-stage counter driven from the 72 kHz clock oscillator C0, comprising units counter Cu, tens counter Ct, hundreds counter Ch, and thousands counter Cth. Each of the counter stages is associated with an appropriate latch Lu, Lt, Lh or Lth and display element Du, Dt, Dh or Dth. Whereas FIG. 2 represented a standard comparator Cm to co-operate with a preselector S to compare a measured value with a standard value, the arrangement of FIG. 3 includes in each of the four sections two standard comparators CH, CL associated with two preselectors SH, SL. The arrangement provides for the preselection of high and low surface level limits corresponding to predetermined maximum and minimum liquid content of the vessel 10 (FIG. 1). The predetermined limits are set in the high value selectors SH and low value selectors SL and are compared with a measured value by the high value standard comparators CH and low value standard comparators CL, the standard comparators CH, CL being coupled respectively with high and low value discriminators M'', M' each of which provides an output +, =, or − to indicate whether a measured liquid level is higher, equal to, or lower than the appropriate limit value. The outputs of the discriminators can be used for a variety of purposes, as mentioned above with reference to FIG. 2; for instance, there may be automatically controllable pumping equipment for filling and emptying the tank 10.

In FIG. 3, for regulating the transmitted pulse length, the count comparator Cr (FIG. 2) in the transmitter T is connected, by connections h, th, only to the hundreds and thousands display devices Dh, Dth, in accordance with the use of the two most significant figures of the four-figure display in the automatic regulating operation.

In FIG. 3, the previously mentioned receiver R of FIG. 2 comprises four stages, namely a pre-amplifier A, a detector R', a low amplitude signal suppressor LD and a correlator RM. The pre-amplifier A serves to amplify the output of the receiver transducer DT in response to the receipt of an echo. The detector R' then operates in the usual manner to reject the ultrasonic frequency component of the output from the pre-amplifier A. It is possible that the echo detected by the receiver transducer DT may contain low amplitude components representing random reflections from source other than the liquid surface 16; such components are rejected in the low amplitude signal suppressor LD which suppresses any signal component less than a predetermined amplitude. The correlator RM includes a mono-stable gate and responds to the receipt of the output from the low amplitude signal suppressor LD to produce a steep-fronted short pulse which, through a connection r, passes to the latches Lu — Lth to cause the count in the counters Cu — Cth to be presented to the display devices Du — Dth and standard comparators CH, CL.

Due to the close proximity of the transducers PT,DT, it is not impossible that a false reading may result from the receiver transducer DT reacting to a pulse derived directly from the transmitter transducer PT, that is other than by reflection from the liquid surface 16. To prevent such an occurrence, the mono-stable gate in the correlator RM is caused to be closed during the transmission of a pulse into the liquid; the control is effected by a branch connection $s'$ to the correlator RM from the main connection $s$ from the thousands counter stage Cth to the transmitter T, whereby, as the oscillator T0 is caused to generate a transmitted pulse, by the 7.2 Hz control derived from the 72 kHz clock oscillator through the counter stage Cth, the path through the correlator RM from the receiver transducer DT is blocked and caused to remain blocked, by appropriately selecting the time constant of the monostable gate, until the generation of a pulse of at least the predetermined maximum length has stopped.

In response to the reception of an echo by the receiver transducer DT there will be presented to the correlator RM a steep-fronted pulse which will cause the correlator RM to pass to the latches Lu — Lth a very short output pulse. It is desirable that the short output pulse shall not be presented to the latches Lu — Lth simultaneously with a counting step in any of the counter stages Cu — Cth, but always between two counting steps. By a connection $t$ from the clock oscillator CO to the correlator RM and by appropriately characterising the mono-stable component of the correlator RM, the latter is conditioned to generate an output pulse, in response to an input from the receiver transducer DT, which is so related in time to the clock oscillator CO frequency that the output pulse will be presented to the latches Lu — Lth between two successive counting steps of the unit counter Cu.

It may be desirable to compensate for reduction in strength of a received echo as the combined path of transmission and reflection increases, i.e. as the liquid depth increases. For this purpose there is provided a variable gain device VG having an output to the detector R' and an input, through a second branch connection $s''$, from the 7.2 Hz connection from the thousands counter stage Cth. The variable gain device VG is normally set to apply minimum gain to the detector R' and is adapted to return to that condition when the continuously cycling counter Cu — Cth passes through zero which, as explained above, coincides with the start of the generation of a transmitted pulse by the ultrasonic frequency generator T0. During the period between the transmission of a pulse towards the liquid surface 16 and the detection of its echo the effect of the variable gain device VG will progressively increase to substantially compensate for reduction in signal strength at the receiver transducer DT as its distance from the liquid surface increases.

As described with reference to FIG. 2, the effect of the automatic regulator is over-ridden by the over-ride device OR, to cause a transmitted pulse of maximum length, e.g. 33 cycles, to be transmitted if no echoes are detected from a predetermined number of successive transmissions. In order to draw the attention of an operator to the situation, i.e. that no echoes are being detected, the over-ride device is coupled to the display devices Du — Dth, by a connection $p$, to provide for them to become blanked out. Additionally, or alternatively, by a similar connection, an audible or visible alarm may be actuated.

It is not impossible that a pulse transmitted by the transmitter transducer PT may result in the receiver transducer DT responding to a double echo, that is an echo from the part of the free surface of the liquid directly above the transducers and a closely following second echo of amplitude greater than would be suppressed by the low amplitude signal suppressor LD. For instance, such a second echo might be a reflection from the boundary region of the liquid surface. To prevent falsification of measurement due to such a second echo, the receiver may include, for instance in association with one of the elements R', LD and RM, a second suppressor whereby immediately after the receiver has responded to the leading edge of the first, or true, echo it will automatically change to a condition in which it will not respond to a subsequent echo, and that condition will persist until the next acoustic pulse is transmitted.

I claim:

1. An ultrasonic acoustic pulse echo ranging system for monitoring the depth of liquid above a datum level in a tank, the system comprising a transmitter transducer and a receiver transducer for mounting side-by-side, upwardly directed and exposed to the liquid in the tank at the datum level, and, for coupling to the transducers from outside the tank, a transmitter including an oscillator to energise the transmitter transducer to transmit acoustic pulses of ultrasonic frequency, a gate to start the oscillator, and a regulator to stop the oscillator to determine the length of each pulse in terms of the number of cycles of the ultrasonic frequency in the pulse, a receiver to detect inputs from the receiver transducer and generate output pulses in response to echoes of the acoustic pulses from the free surface of the liquid, a clock-oscillator-driven continuously cycling digital counter to actuate said gate to start an acoustic pulse at the start of each counting cycle, a several-figure digital display device, and latching means responsive to a receiver output pulse to connect the digital counter to the display device to display a function of the time interval between the transmission of an acoustic pulse and the detection of its echo, said regulator including a regulating counter of the ultrasonic cycles which is re-settable at zero by the stopping of the oscillator, a count comparator having an input from said display device and an input from said regulating counter, and a bi-stable element to provide a first path from the regulating counter to the oscillator and an alterative second path from the count comparator to the oscillator, the regulating counter being adjustable to preselect a maximum length of transmitted acoustic pulse, and the count comparator co-relating said display and the count by the regulating counter to provide that when the display derived from the transmission of an acoustic pulse and the detection of its echo is a function of a time interval greater than a predetermined value the oscillator will be stopped through said first path to terminate the next transmitted pulse at said maximum length, and that when said display so derived is a function of the time interval being less than said predetermined value the oscillator will be stopped through said second path to terminate the next transmitted pulse at a length proportionately less than said maximum length.

2. An ultrasonic acoustic pulse echo ranging system as claimed in claim 1, in which circuitry from the regulator through the bi-stable element to the oscillator has a delay characteristic to provide that the number of cycles in each transmitted pulse is one more than determined by the regulator.

3. An ultrasonic acoustic pulse echo ranging system as claimed in claim 2, in which an over-ride is connected between the receiver output and said second path through the bi-stable element of the regulator, and the over-ride is biassed to be responsive to absence of a predetermined number of successive receiver output pulses to block said second path, whereby the regulator will cause an acoustic pulse of said maximum length to be transmitted after the absence of said predetermined number of successive receiver output pulses.

4. An ultrasonic acoustic pulse echo ranging system for monitoring the depth of liquid above a datum level in a tank, the system comprising a transmitter transducer and a receiver transducer for mounting side-by-side, upwardly directed and exposed to the liquid in the tank at the datum level, and, for coupling to the transducers from outside the tank, a transmitter including an ultrasonic frequency oscillator to energise the transmitter transducer to transmit acoustic pulses of the ultrasonic frequency, a gate to start the oscillator, a continuously cycling counter coupled with and effective to actuate the gate to start the oscillator at the start of each counting cycle, a regulator to stop the oscillator to determine the length of each transmitted acoustic pulse in terms of the number of cycles of the ultrasonic frequency in the pulse, a receiver to detect outputs from the receiver transducer and to generate output pulses in response to echoes of the acoustic pulses from the free surface of the liquid, a display device, and latching means responsive to a receiver output pulse to connect the counter to the display device to display a measure of the time interval between the transmission of an acoustic pulse and the detection of its echo, the regulator including a regulating counter of the ultrasonic cycles which is resettable at zero by the stopping of the oscillator, and the regulator including a count comparator, which is coupled to the latching means, to determine that the regulator is responsive to variations between successive measured time intervals to regulate, in the sense of the variations, the length of the next transmitted pulse.

5. An ultrasonic acoustic pulse echo ranging system as claimed in claim 4, wherein there is provided an adjustable pre-selector of a standard value of a function of a time interval, standard comparator coupled to the latching means and to the pre-selector to compare said standard value with the measured values derived from detection of echoes of the transmitted acoustic pulses, and, coupled to the standard comparator, a discriminator to provide an output representative of the relation between said standard value and each measured value.

6. An ultrasonic acoustic pulse echo ranging system as claimed in claim 4, in which said regulator is responsive to said measured time interval being not less than a predetermined minimum value to regulate the number of cycles of the next transmitted pulse to a predetermined maximum value, is responsive to said measured time interval being less than said minimum value to regulate the number of cycles of the next transmitted pulse to a value less than said maximum value, and is responsive to variation of successive measured time intervals of value not greater than said minimum value to regulate, in the sense of the variation, the number of cycles of succeeding transmitted pulses.

7. An ultrasonic acoustic pulse echo ranging system as claimed in claim 6, having a regulator over-ride responsive to outputs from the receiver transducer to actuate the regulating means to regulate the number of cycles of the transmitted pulses to said maximum value in response to the absence of outputs from the receiver transducer.

8. An ultrasonic acoustic pulse echo ranging system as claimed in claim 6, wherein there is provided an adjustable pre-selector of a standard value of said function of a time interval, a first comparator of said standard value and the measured values derived from detection of echoes of the transmitted acoustic pulses, and, coupled to said first comparator, a discriminator to provide an output representative of the relation between said standard value and each measured value.

* * * * *